United States Patent
Bienick et al.

(10) Patent No.: US 6,558,596 B1
(45) Date of Patent: May 6, 2003

(54) METHOD OF MOLDING A PERIPHERALLY ENCAPSULATED PRODUCT UNDER HEAT AND PRESSURE UTILIZING SHEET MOLDING COMPOUND (SMC) OR BULK MOLDING COMPOUND (BMC)

(75) Inventors: Craig Bienick, Jenison, MI (US); Bob Herrmann, Spring Lake, MI (US); Howard Daley, Zeeland, MI (US)

(73) Assignee: Gemtron Corporation, Sweetwater, TN (US)

( * ) Notice: Subject to any disclaimer, the term of this patent is extended or adjusted under 35 U.S.C. 154(b) by 0 days.

(21) Appl. No.: 09/277,756

(22) Filed: Mar. 29, 1999

(51) Int. Cl.[7] ............................................... B29C 43/20
(52) U.S. Cl. ..................... 264/154; 264/275; 264/325; 425/112; 425/117
(58) Field of Search ................................ 264/154, 247, 264/275, 325, 328.2, 334; 425/808, 117, 112

(56) References Cited

U.S. PATENT DOCUMENTS

| | | | |
|---|---|---|---|
| 2,137,472 A | 11/1938 | Forbes | |
| 2,266,169 A | 12/1941 | Crumrine | |
| 2,559,860 A | 7/1951 | Fay | |
| 3,341,647 A | 9/1967 | Aberle | |
| 3,399,018 A | 8/1968 | Leblanc | |
| 3,766,186 A * | 10/1973 | Mach et al. | 264/269 |
| 3,947,615 A | 3/1976 | Fry | |
| 3,957,943 A * | 5/1976 | Ogura | 264/245 |
| 3,971,841 A | 7/1976 | Rubinstein | |
| 4,248,818 A | 2/1981 | Elizabeth | |
| 4,254,960 A * | 3/1981 | Jelinek | 277/12 |
| 4,626,185 A | 12/1986 | Monnet | |
| 4,695,420 A | 9/1987 | Grawey et al. | |
| 5,001,000 A | 3/1991 | Rohrbacher et al. | |
| 5,273,354 A | 12/1993 | Herrmann et al. | |
| 5,329,686 A | 7/1994 | Kildal et al. | |
| 5,362,145 A | 11/1994 | Bird et al. | |
| 5,403,084 A | 4/1995 | Kane et al. | |
| 5,429,433 A | 7/1995 | Bird et al. | |
| 5,441,338 A | 8/1995 | Kane et al. | |
| 5,454,638 A | 10/1995 | Brid et al. | |
| 5,494,615 A | 2/1996 | Lee | |
| 5,665,397 A * | 9/1997 | Fisher et al. | 425/116 |
| 5,676,894 A | 10/1997 | Specht | |
| 5,705,108 A | 1/1998 | Nonogaki | |
| 5,738,880 A * | 4/1998 | Kane et al. | 425/116 |
| 6,120,720 A * | 9/2000 | Meier et al. | 264/261 |

* cited by examiner

Primary Examiner—Jan H. Silbaugh
Assistant Examiner—Edmund H. Lee
(74) Attorney, Agent, or Firm—Diller, Ramik & Wight

(57) ABSTRACT

A peripherally encapsulated product, such as an oven door outer shell, is molded in accordance with this invention by placing a piece of glass between mold clamping portions of relatively movable closed bodies when the latter are in an open position. Preferably both bodies are heated and thermosetting polymeric material (SMC or BMC) is placed upon selected areas of one of the mold bodies within and about an area corresponding to an annular mold cavity and outboard of a peripheral edge of a piece of glass. The glass is clamped between mold clamping portions of the mold bodies which are then progressively closed creating compression forces which extrude the thermosetting polymeric material into the annular cavity and into complete encapsulation of the continuous peripheral edge of the piece of glass. The thermosetting polymeric material is cured, the mold bodies are opened and the product is removed therefrom. The encapsulated product can be provided with post-formed vent openings and/or handle attaching openings or the handle can be integrally molded during the molding process.

51 Claims, 9 Drawing Sheets

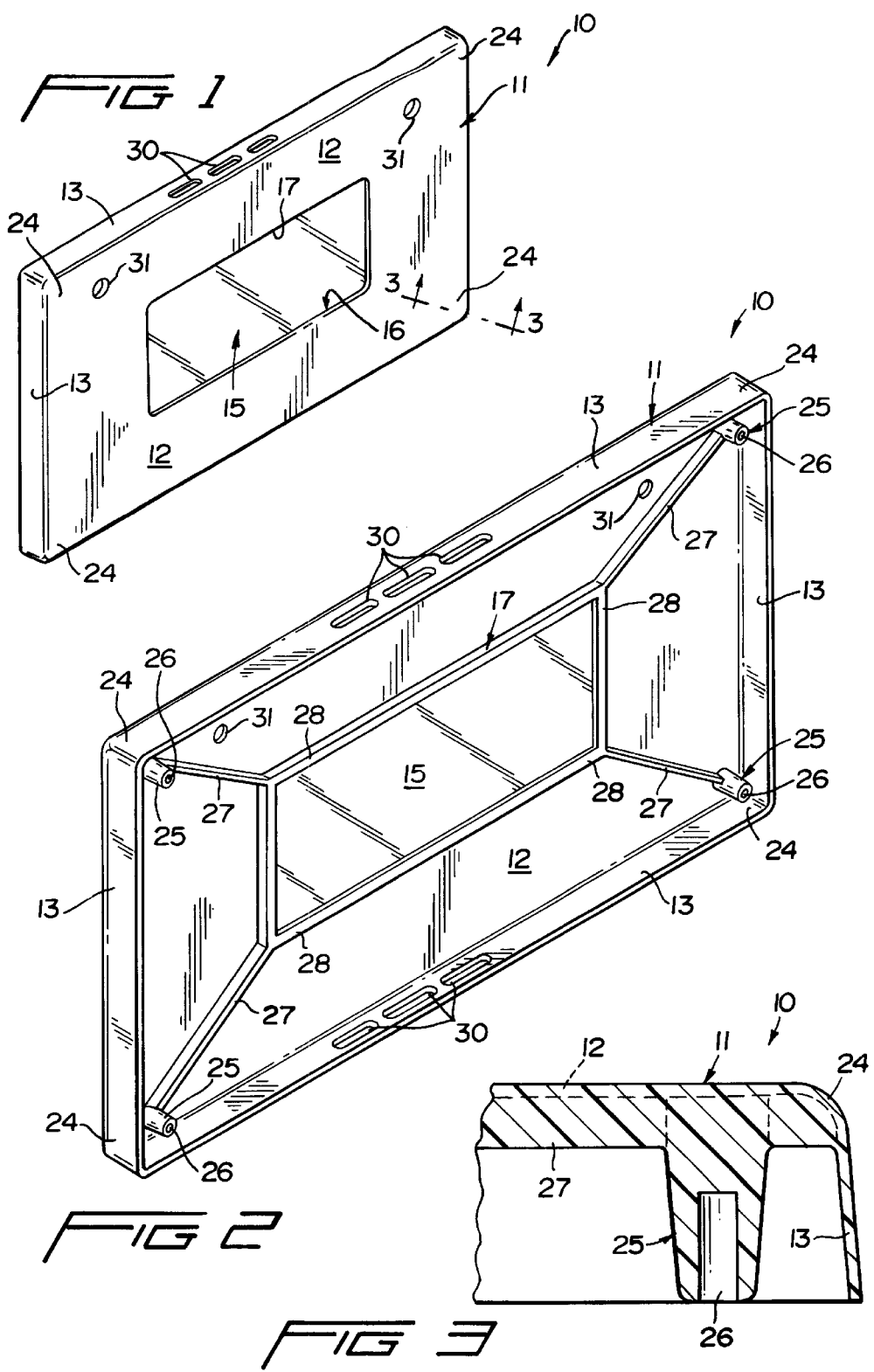

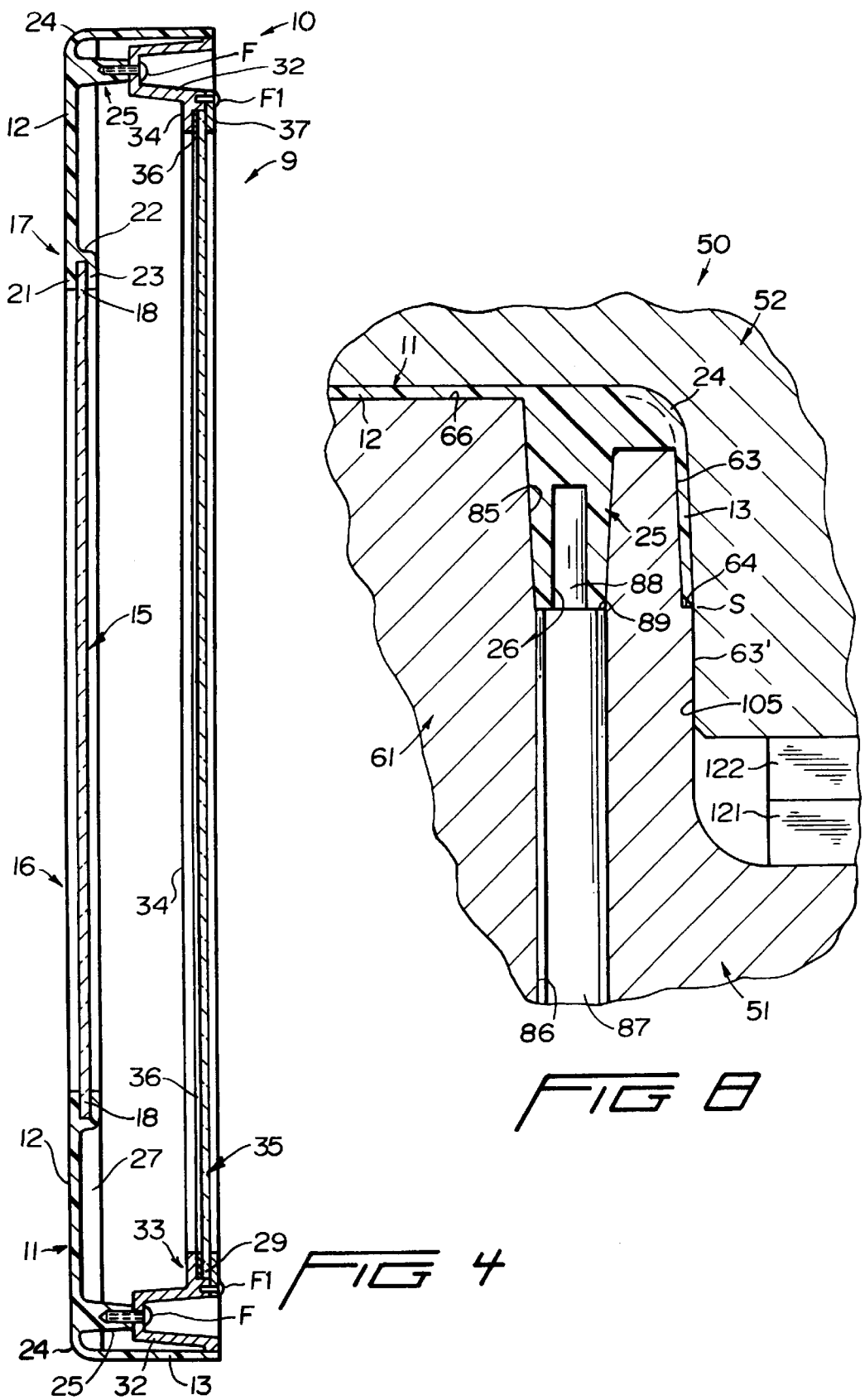

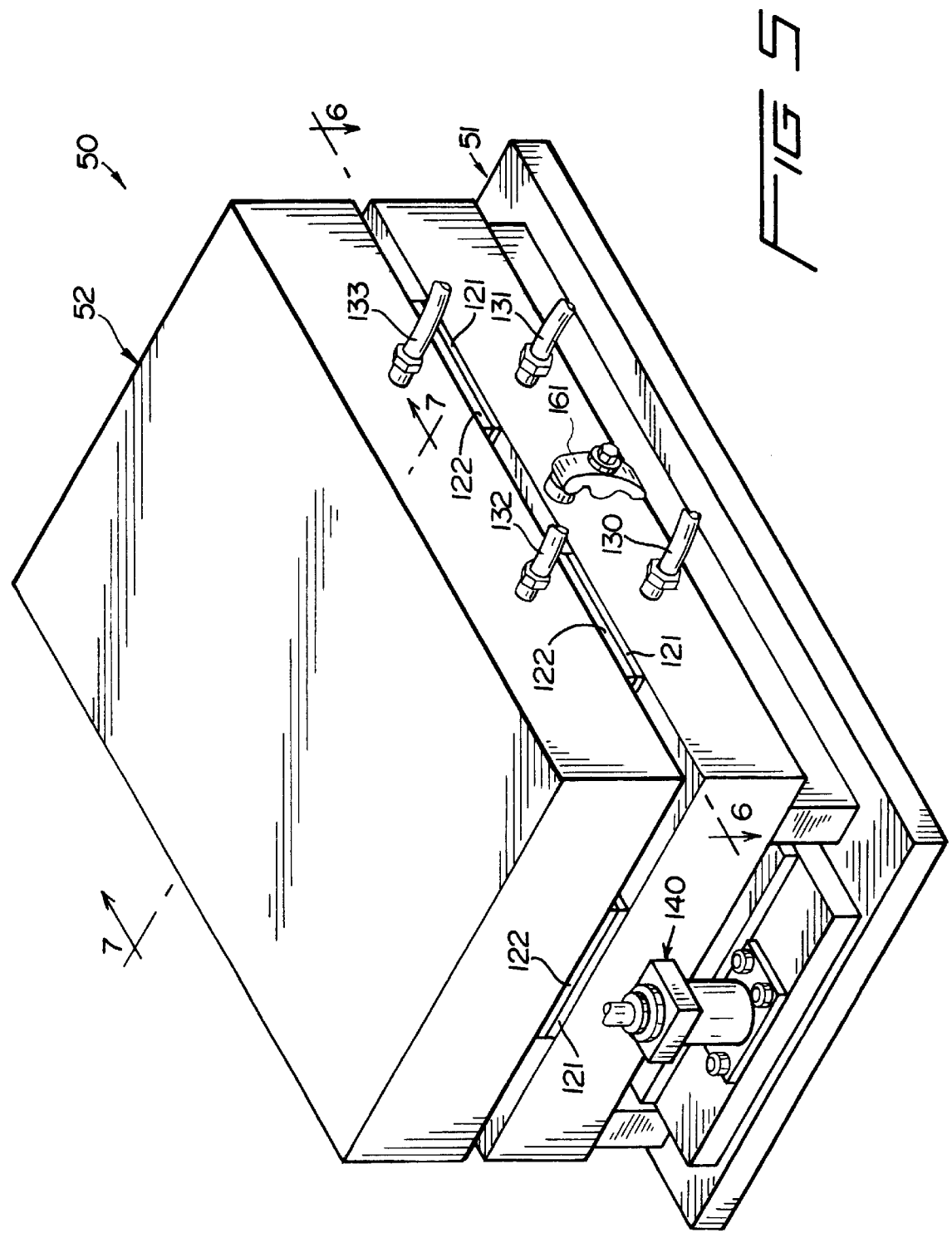

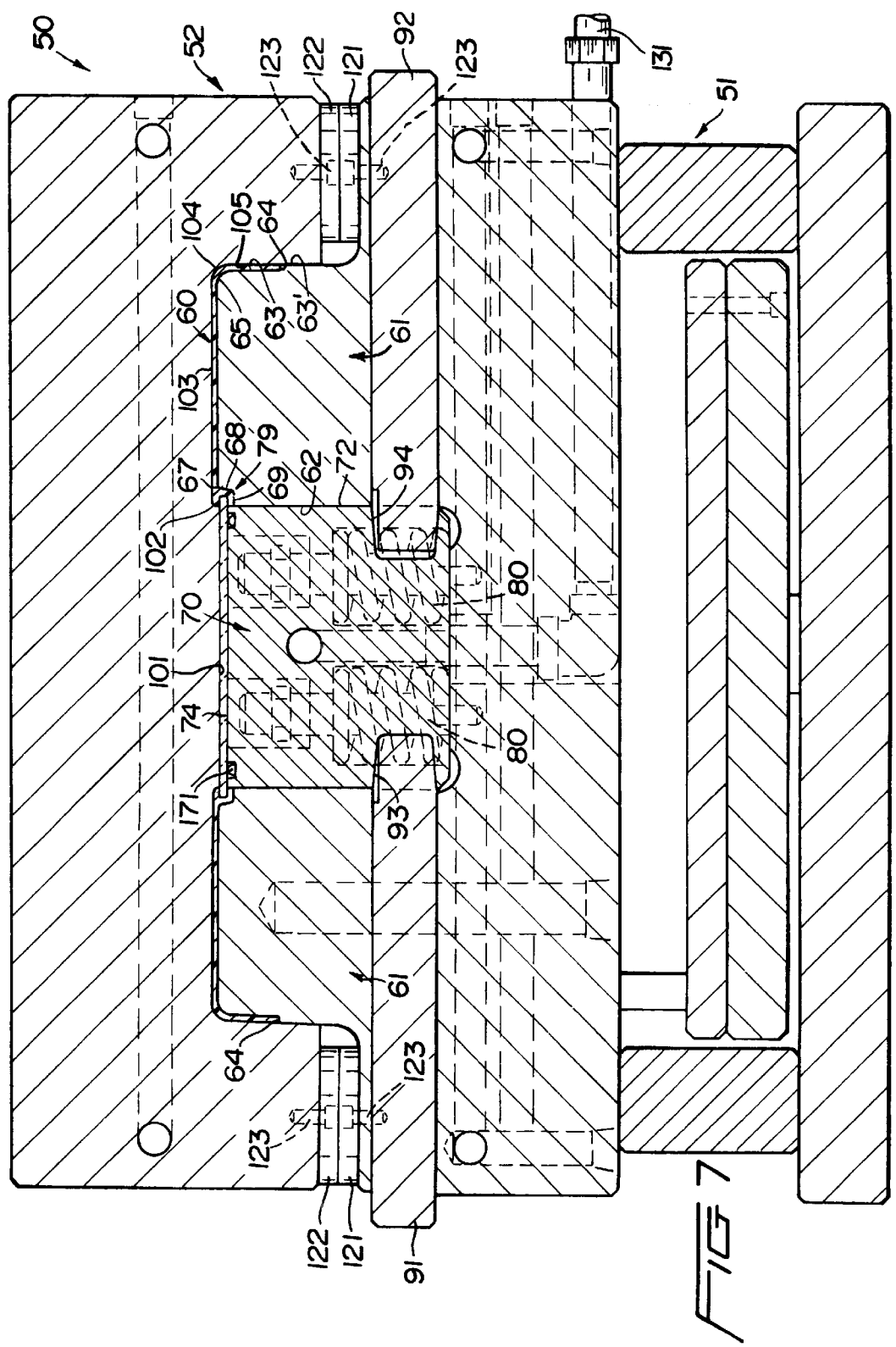

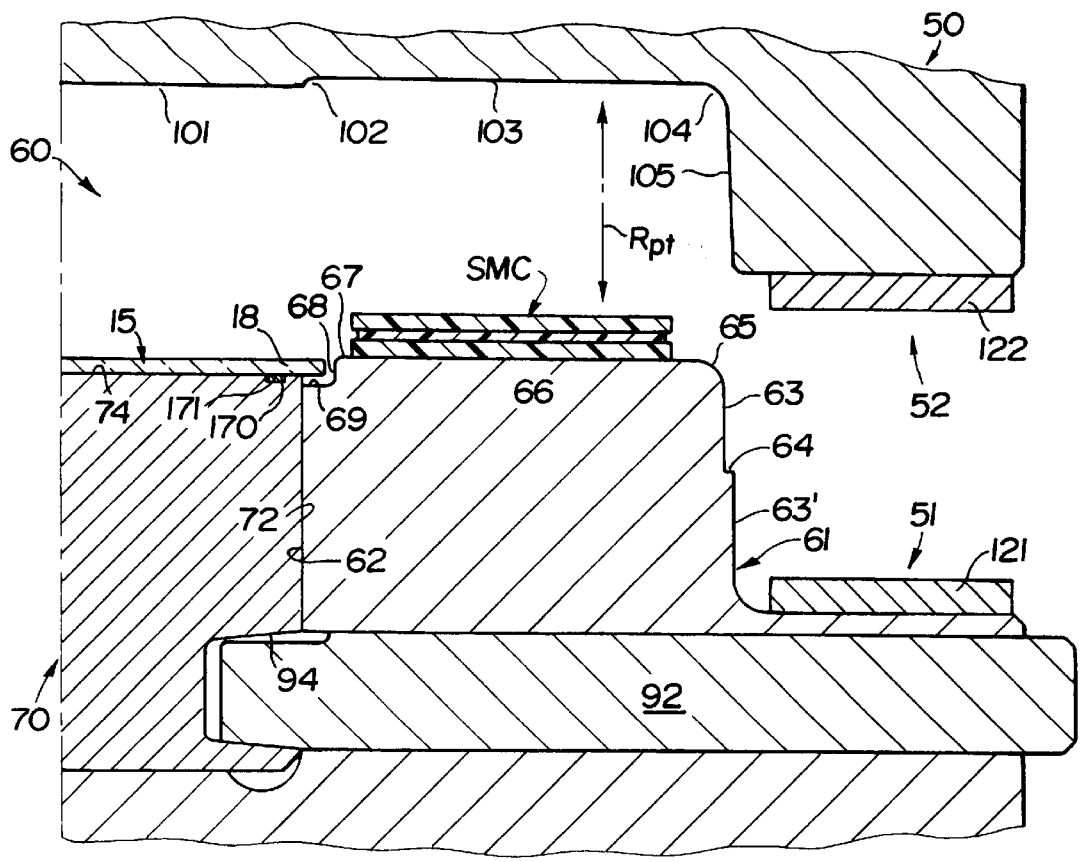
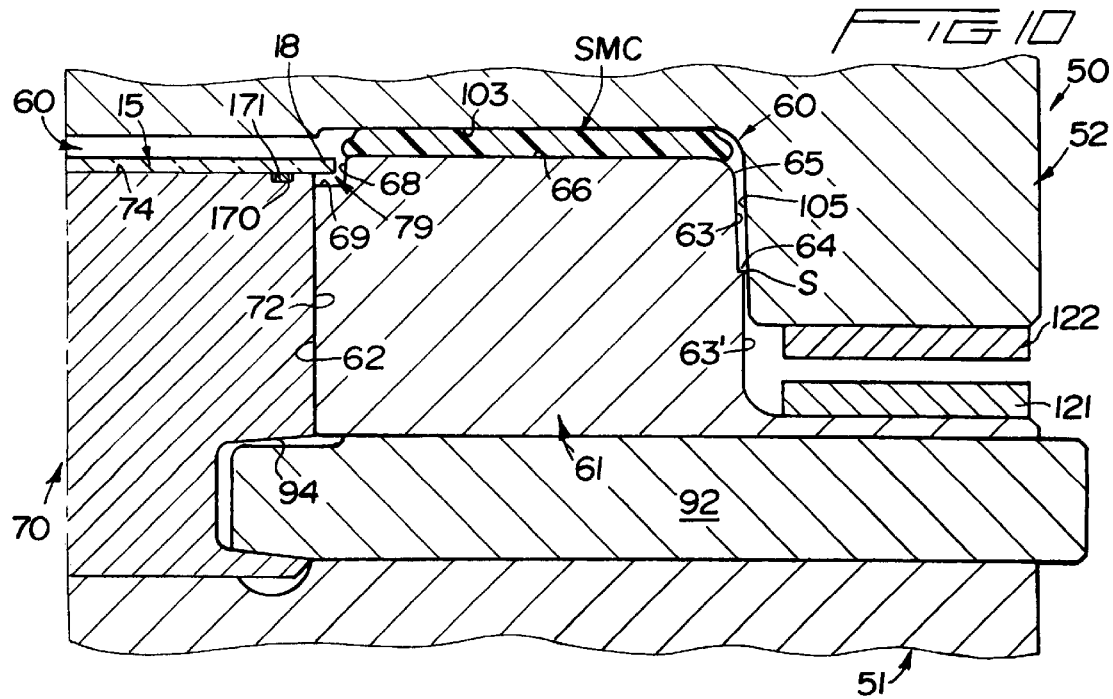

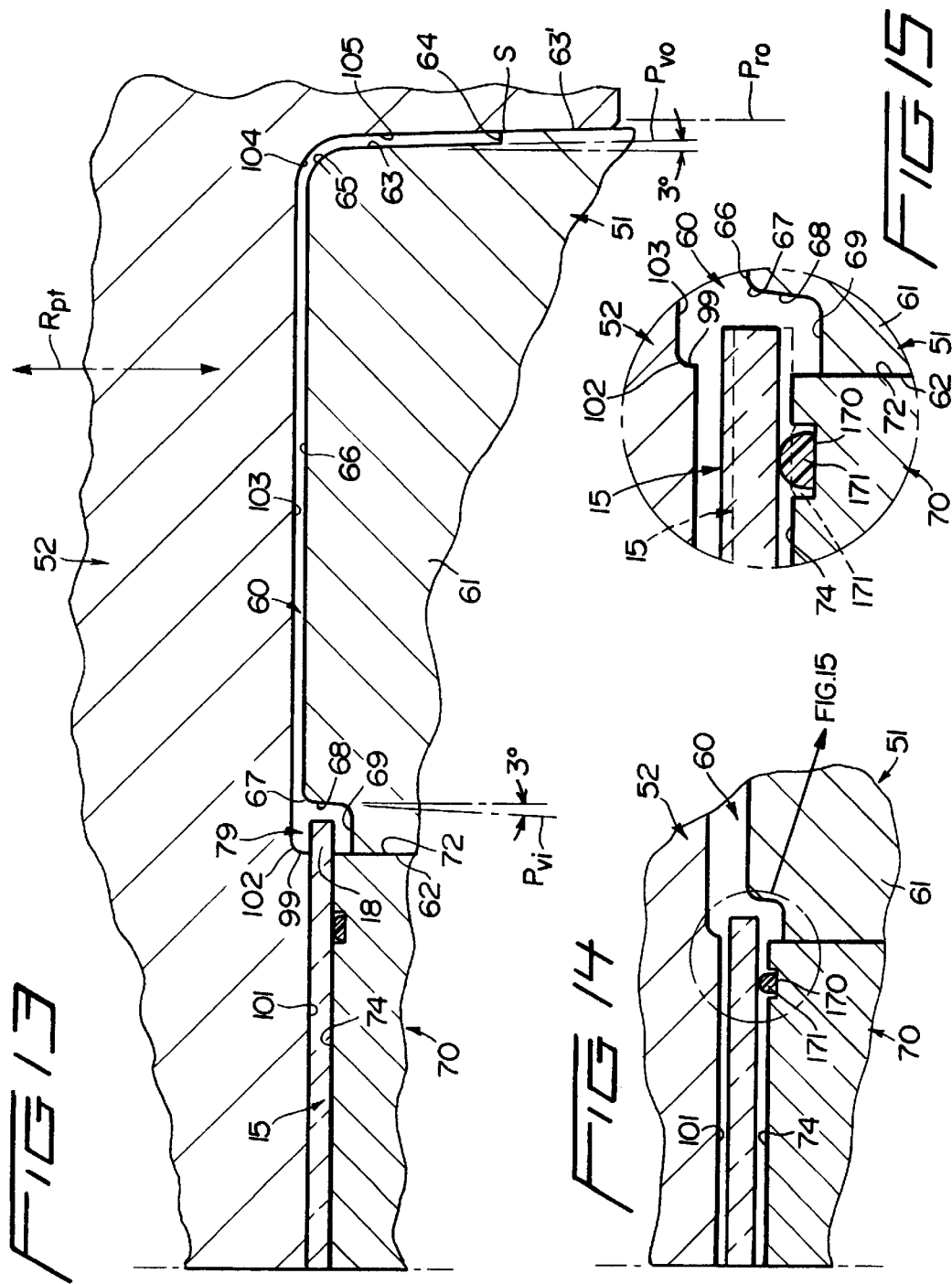

METHOD OF MOLDING A PERIPHERALLY ENCAPSULATED PRODUCT UNDER HEAT AND PRESSURE UTILIZING SHEET MOLDING COMPOUND (SMC) OR BULK MOLDING COMPOUND (BMC)

TITLE OF THE INVENTION

A Method of Molding a Peripherally Encapsulated Product Under Heat and Pressure Utilizing Sheet Molding Compound (SMC) or Bulk Molding Compound (BMC), and The Peripherally Encapsulated Product

BACKGROUND OF THE INVENTION

It is conventional to insert a small panel or piece of glass into a cavity of a multi-part mold and inject therein under elevated temperature and pressure polymeric/copolymeric material which peripherally encapsulates a peripheral edge of the glass. An early injection molding system of this type was used, for example, to manufacture lens mounts, as disclosed in U.S. Pat. No. 2,266,169 in the name of Chester W. Crumrine which granted on Dec. 16, 1941. A lens element is clamped between two centering plungers which hold the lens with a peripheral edge thereof projecting into an annular cavity into which hot plastic is injected under pressure, cools and is subsequently removed from the mold cavity in the form of a lens mount. Similar injection molding to form peripherally encapsulated pieces of glass are found in U.S. Pat. Nos. 2,559,860 and 3,971,841 issued to Howard G. Fay and Leon Rubinstein, respectively, on Jul. 10, 1951 and Jul. 27, 1976, respectively. Each of these two patents relate to lens systems for photographic apparatus.

Larger pieces of glass have also been similarly provided with an injection molded rim, encapsulation, or frame, as in U.S. Pat. Nos. 4,626,185; 4,695,420 and 5,676,894 in the respective names of Bernard Monnet, Charles E. Grawey et al. and Paul Specht, which issued respectively on Dec. 2, 1986; Sep. 2, 1987 and Oct. 14, 1997. Such larger encapsulated glass structures are typically used as curved automobile glass panels, printed circuit boards, window panes, structural paneling, and the like.

Another approach toward the manufacture of a frame member which encapsulates a peripheral edge of a panel is found in U.S. Pat. No. 5,329,686 in the name of Maurice A. Kildal et al. issued on Jul. 19, 1994. In this patent a panel is placed between a frame member with an edge thereof being located in a recess while an integral lip of the frame member can be bent a distance sufficient to allow the panel to be peripherally clamped to the frame. Heretofore eye glass rims were so constructed, as is evidenced by U.S. Pat. No. 3,399,018 in the name of Conrad L. Leblanc issued on Aug. 27, 1968.

Well prior to the latter disclosures, powdered material was placed in an annular cavity of a mold into which was inserted a piece of tempered glass, and upon the closing of the mold with the glass clamped and centered therein, the powdered material melted and fused to a periphery of the glass. Typical of this process was the utilization of "Bakelite" powder in the manner disclosed in U.S. Pat. No. 2,137,472 granted to Lewis Jex-Blake Forbes on Nov. 22, 1938.

In lieu of powder which can be molded under heat and pressure, as defined in the aforementioned patent, it had been common for years to utilize a ring or ring-like member of elastomeric material to form a seal for bearings or the like by placing the elastomeric member and a metal reinforcing member in a mold and closing the same under heat and pressure, as disclosed in U.S. Pat. No. 3,341,647 granted on Sep. 12, 1967 to Douglas J. Aberle. The seal is extruded about an inner periphery of the reinforcing member and is appropriately contoured to provide dual-lip seals with excess material being squeezed radially outwardly into a cavity for collecting excess unwanted elastomer.

Somewhat similar to the latter process is that of manufacturing such items as loudspeaker diaphragms between a pair of mating molds by inserting therein the diaphragm and, adjacent an edge thereof, a strip-shaped base material consisting of rubber as a main composition with an associated foaming agent. During heat and pressure molding in the cavity of the close mold the rubber is vulcanized and defines a foamed edge self-adhered to the outer periphery of the diaphragm, as disclosed in U.S. Pat. No. 5,705,108 issued Jan. 6, 1998 to A. Nonogaki.

The assignee of the present invention has expertise in the injection molded encapsulation of tempered glass which is used primarily for shelving, particularly for refrigerators, as is evidenced by U.S. Pat. Nos. 5,273,354; 5,362,145; 5,403,084; 5,429,433; 5,441,338 and 5,454,638 issued respectively on Dec. 28, 1993; Nov. 8, 1994; Apr. 4, 1995; Jul. 4, 1995; Aug. 15, 1995 and Oct. 3, 1995, all assigned to the assignee of the present application.

Typically, such encapsulated shelves are manufactured in an injection mold of the type disclosed in pending application Ser. No. 08/303,200 filed on Sep. 8, 1994 in the names of Max Meier et al. In the latter disclosure a tempered glass plate or panel has its peripheral edge located in a peripheral or annular cavity into which highly pressurized, hot, synthetic plastic polymeric/copolymeric material is injected and, upon subsequent cooling, the peripheral edge of the panel is bounded by a polymeric frame, rim or encapsulation which, since intended for use as a refrigerator shelf, has also integrally unitized thereto during molding opposite metallic shelf brackets.

A cooktop can be manufactured in much the same manner as that described immediately above, and a full disclosure thereof is found in commonly assigned pending U.S. application Ser. No. 08/890,651 filed on Jul. 9, 1997.

SUMMARY OF THE INVENTION

In keeping with the foregoing, a primary object of the present invention is to provide a novel and unobvious method of manufacturing a peripherally encapsulated unit, such as a range oven door, which in use is subject to relatively high temperatures, particularly when an oven is being automatically cleaned under elevated temperatures. Range oven doors are presently manufactured from metal which has a high degree of rigidity and temperature stability, resist distortion, can withstand abuse, etc. However, conventional range oven doors are made of many different pieces requiring separate formation, fabrication and assembly. Most commonly, such conventional range oven doors include a multipiece, inner, metal door frame assembly and a multipiece, oven door outer shell assembly. The latter are individually manufactured to include an oven door inner metal frame and an oven door outer shell, each of which has a tempered glass viewing panel or window. A separate metallic connecting flange through which fasteners pass is utilized for securing each glass panel to its associated frame and/or shell. The outer shell is also necessarily primed and painted to match or complement the color of the range/oven. All of this is extremely time consuming and costly.

The prior art patents referenced earlier herein suggest the manufacture of a range oven door by injection molding polymeric/copolymeric material under heat and pressure to encapsulate a peripheral edge of a tempered glass sheet. Unfortunately, the polymeric/copolymeric plastic materials available for injection molding cannot maintain tolerances, particularly if heated to relatively high temperatures. In other words, such materials generally lack relatively high hot rigidity at temperatures associated with baking, and even under relatively low temperatures the strength to weight ratio is relatively low i.e., the polymeric material is relatively weak and lacks the necessary strength, toughness and rigidity to withstand normal range oven door usage. Furthermore, while smaller products can be formed by injection molding polymeric material about the edge of a piece of glass, larger products create additional manufacturing problems, such as the control, reduction or elimination of product shrinkage. Absent non-shrink or low-shrink characteristics, it would be essentially impractical, if not impossible, to form an injection molded encapsulated polymeric/copolymeric oven door, be it an oven door outer shell or an oven door inner frame or both and connect the two together with repetitive accuracy. The individual shrinkage of each and the effects thereof one upon the other would essentially preclude either (a) inner and outer encapsulated units from being matchingly connected together or (b) either such encapsulated units from being matchingly connected to its multipart metal counterpart to form a commercially acceptable range oven door.

With the foregoing in mind, applicants have provided herewith a novel and unobvious method of molding a relatively large peripherally encapsulated product, such as a range oven door and specifically an oven door outer shell thereof by placing a piece of tempered glass between mold clamping portions of mold bodies when the latter are in an open position. One and preferably both of the mold bodies are heated and thermosetting polymeric material in the form of sheet molding compound (SMC) or bulk molding compound (BMC) is positioned upon one of the heated mold bodies within and about an area corresponding to an annular or peripheral mold cavity or chamber and outboard of a substantially continuous peripheral edge of the piece of tempered glass. The mold bodies are then progressively closed to thereby create compression forces upon the SMC/BMC which extrude the thermosetting polymeric material into the annular chamber and into complete peripheral edge encapsulation of the continuous peripheral edge of the tempered glass, including opposite face surfaces and a peripheral edge surface therebetween. As the mold bodies close, surfaces thereof define peripheral seals which prevent the SMC/BMC from escaping the annular mold cavity and instead the SMC/BMC is subject to relatively high compression forces which assure that the mold cavity is completely and intimately filled. After curing the thermosetting polymeric material under such heat and pressure, the mold bodies are opened and the peripherally encapsulated product is removed.

The steps of the method just described, when performed in conjunction with the proper weight and distribution of the thermosetting polymeric material (SMC/BMC) upon the associated mold body, assures the molding of a relatively dense, strong, tough and smooth-surfaced product essentially absent discernable flash, flash material, mold parting lines, voids, etc. Furthermore, since SMC/BMC can be effectively "non-shrink" compositions, as set forth in U.S. Pat. No. 3,947,615, the end product can be readily molded to exacting specifications and can readily fulfil its function, preferably as an oven door outer shell of an oven range door, for example.

In further accordance with the molding method of this invention, the annular mold cavity or chamber is contoured to impart to the oven door outer shell an annular front wall bounding the panel of tempered glass and being integrally united thereto under the heat and pressure of the "extruded" SMC/BMC thermosetting material, while simultaneous therewith a flange-forming chamber portion of the annular mold cavity is likewise filled with the "extrudate" under heat and pressure to form an integrally molded peripheral flange. Additionally, the mold cavity is contoured to provide reinforced fastener-receiving bosses and reinforcing ribs at corners of the oven door outer shell.

In further keeping with the present invention, during the closing of the annular mold chamber, opposing surfaces of the flange-forming mold cavity portion thereof meet and form a "sliding" outer peripheral seal which prevents the polymeric material from being "extruded" beyond the annular mold cavity under high molding pressures thus resulting in a relatively dense, smooth-surfaced, accurately dimensioned product.

The molded oven door outer shell constructed in accordance with the process of this invention is thus defined by a single piece of hot molded integral thermosetting polymeric material, such as SMC or BMC, forming a generally polygonal frame member defined by a front wall of a substantially annular configuration disposed substantially transverse to a peripheral wall or flange. The thermosetting polymeric molding compound has an inboardmost pressure "extruded" peripheral edge portion which encapsulates a peripheral edge of a piece of tempered glass, including opposite peripheral face surfaces and a peripheral edge surface therebetween. This oven door outer shell, for example, can serve as a replacement for a conventional stainless steel oven door outer shell and can be united to the conventional inner steel frame by conventional fasteners threaded into the integrally molded reinforced fastener-receiving bosses at the corners of the polygonal frame member. The reinforcing ribs assure rigidity to the range oven door and/or the outer shell thereof over an extended lifetime of use.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a front perspective view of a peripherally encapsulated product, such as a range oven door, but preferably an outer shell thereof, and illustrates a generally polygonal annular frame member defined by a front annular wall and a peripheral flange with the front annular wall defining an opening within which is housed a piece of tempered glass.

FIG. 2 is an enlarged rear perspective view of the peripherally encapsulated product of FIG. 1, and illustrates integrally molded reinforced fastener-receiving bosses and reinforcing ribs adjacent corners of the frame member, and an inboard peripheral edge portion of the annular wall in gripping encapsulated relationship to the peripheral edge of the piece of tempered glass.

FIG. 3 is a highly enlarged fragmentary cross sectional view taken generally along line 3—3 of FIG. 1, and illustrates details of the front wall, the peripheral flange, a reinforcing rib and one of the fastener-receiving bosses of the oven door outer shell.

FIG. 4 is a cross sectional view taken through the outer shell of FIG. 2, and illustrates the manner in which the tempered glass panel is retained therein and fasteners received in the bosses for uniting the outer shell to a conventional stainless steel range oven inner frame to which another piece of tempered glass is assembled by a clamping ring and associated fasteners.

FIG. 5 is a perspective view of a mold in which the peripherally encapsulated product or outer shell of FIGS. 1–4 is molded, and illustrates two mold bodies in the closed position thereof.

FIG. 7 is a cross sectional view taken generally along line 7—7 of FIG. 5, and illustrates an upper mold body in closed relationship to a lower mold body and defining therewith an annular mold cavity with a piece of tempered glass clamped between a central clamping mold portion of the upper mold body and the lower mold body floater incident to the molding of the outer shell during which the SMC (or BMC) is compression/extrusion molded to the configuration of the outer shell more specifically illustrated in FIGS. 2, 3 and 4 of the drawings.

FIG. 8, which appears on the sheet of drawing containing FIG. 4, is an enlarged fragmentary cross sectional view taken generally-along line 8—8 of FIG. 6 and illustrates details of the mold bodies for forming each reinforced fastener-receiving securing boss at each corner of the outer shell.

FIG. 9 is an enlarged fragmentary vertical cross sectional view of the right-hand side of the mold illustrated in FIG. 7 in the open position thereof, and illustrates the floater in its locked position, a piece of tempered glass resting upon the floater and SMC supported upon an upper annular surface of the lower mold body.

FIG. 10 is a cross sectional view of the mold substantially identical to FIG. 9, and illustrates the upper mold body being closed which causes the heated SMC material to be compressed/extruded throughout the progressively closing mold cavity, and a peripherally outermost "sliding" seal defined between contacting mold surfaces to prevent the SMC from being extruded beyond a terminal edge of a peripherally outermost flange forming cavity portion of the mold cavity.

FIG. 13 is a highly enlarged cross sectional view of the mold bodies in the closed position thereof corresponding to the position shown in FIG. 11 and illustrates enlarged details of surfaces defining the mold cavity absent SMC/BMC therein.

FIG. 14 is a fragmentary enlarged view of the mold bodies approaching the closed position thereof corresponding to FIG. 10, and illustrates the manner in which the tempered piece of glass is supported above an upper surface of the floater upon a bull nose or half round annular cushioning ring housed in an upwardly opening annular channel of the floater.

FIG. 15 is a highly enlarged fragmentary cross sectional view of the encircled portion of FIG. 14, and illustrates the tempered glass panel elevated above a surface of the floater and in phantom outline the completely compressed position of the cushioning ring fully accommodated within its associated upwardly opening channel.

DESCRIPTION OF THE PREFERRED EMBODIMENT

Figure 6:
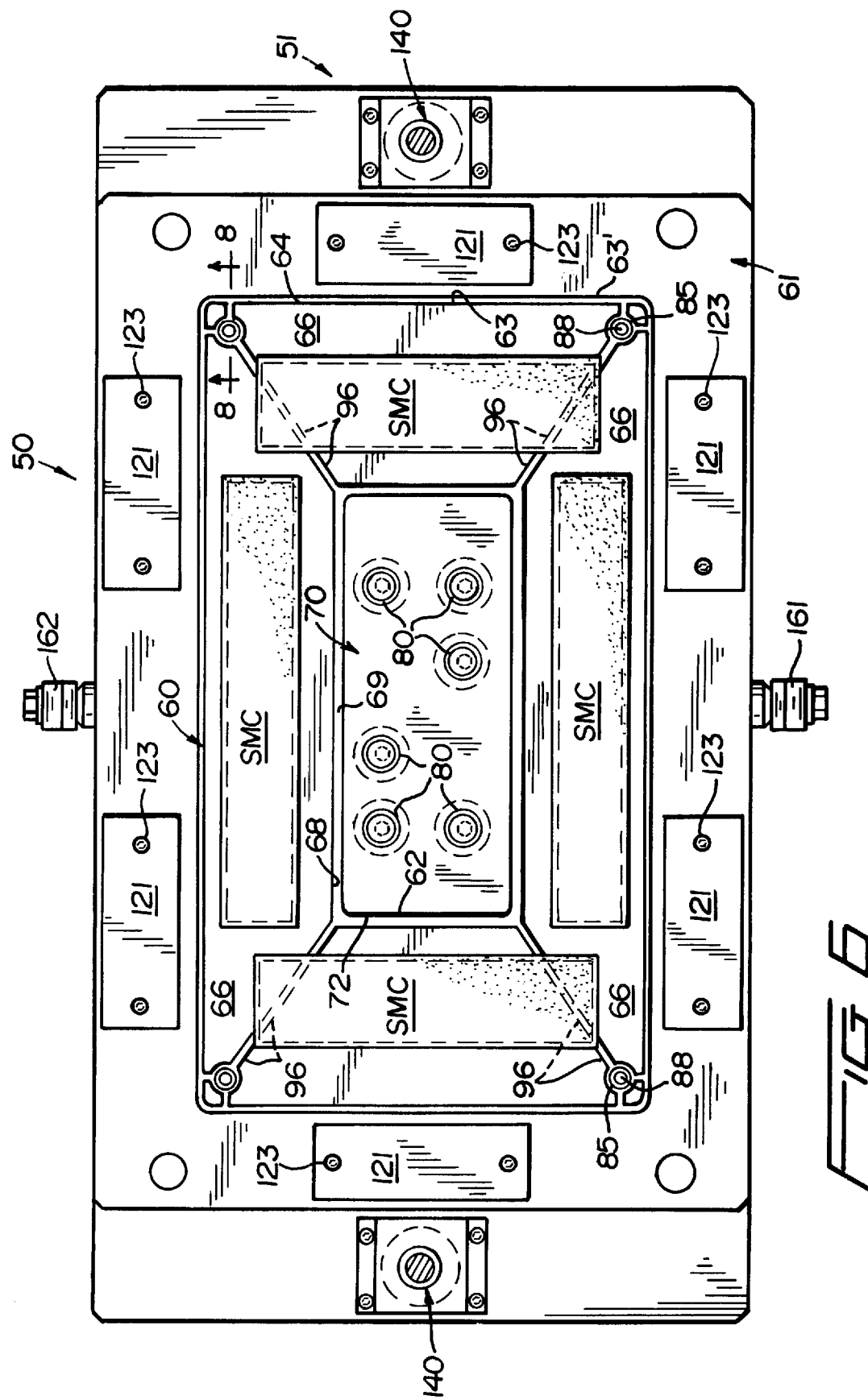
FIG. 6 is a slightly enlarged cross sectional view looking down along line 6—6 of FIG. 5, and illustrates a generally polygonal centrally located spring biased floater or glass clamping mold portion surrounded by a generally outermost annular mold member having an upper surface upon which is positioned four stacks of SMC/BMC or equivalent thermosetting polymeric material.

A peripherally encapsulated product molded in accordance with this invention is illustrated in FIGS. 1, 2 and 3 of the drawings, and is generally designated by the reference numeral 10.

The peripherally encapsulated product 10 is a range oven door, but more specifically and preferably, an oven door outer shell 10 which is united to a conventional metal oven inner door frame assembly 9, (FIG. 4) of a conventional construction which will be described in more detail hereinafter.

The oven door outer shell 10 is comprised as a substantially single integral homogeneous piece of hot compression molded thermosetting polymeric material (SMC or BMC) forming a generally polygonal annular frame member 11 defined by a front annular wall 12 and a peripheral wall or flange 13. The front wall 12 is disposed substantially transverse or normal to the peripheral wall or flange 13 and borders the same about its entire periphery. A piece of generally polygonal, square or rectangular tempered glass or a glass panel 15 closes an opening 16 defined by an innermost polygonal edge portion 17 of the front wall 12. A peripheral edge 18 (FIGS. 4, 11 and 12) of the tempered glass panel 15 is totally encapsulated by the innermost peripheral edge portion 17 of the front wall 12 and is defined by an outermost border portion, flange or edge 21 (FIGS. 4, 11 and 12), an innermost border portion, flange or edge 23 and a peripheral juncture portion 22 therebetween.

At each of four substantially identical corners 24 of the annular frame member 11 are means 25 (FIGS. 2, 3 and 8) in the form of inwardly projecting cylindrical fastener-receiving bosses for threadably receiving in cylindrical bores 26 thereof conventional fasteners F (FIG. 4) which unite the oven door outer shell 10 to the oven door inner frame or assembly 9. Means 27 in the form of an inwardly directed reinforcing rib is provided at each corner 24 of the annular frame member 11 extending substantially between each boss 25 and an associated inboardmost corner 28 (FIG. 2) of the innermost polygonal edge portion 17 of the front wall 12.

One or more relatively elongated vent slots 30 (FIGS. 1 and 2) can be post-formed in upper and lower portions (unnumbered) of the peripheral flange 13, should such be found necessary or desirable. Additionally, holes 31 (FIGS. 1 and 2) can be formed in the front wall 12 during the molding of the annular frame member 11 or post-formed therein for the receipt of fasteners for securing a handle (not shown) to the outer shell 10. In lieu of the latter, the mold bodies to be described hereinafter can be appropriately contoured to integrally mold a handle from a portion of the material of the front wall 12.

As is best illustrated in FIG. 4, the conventional oven door inner frame assembly 9 includes an inner polygonal annular frame 33 having four generally hollow legs 32 through which the fasteners F pass for self-threading into the bores 26 of the bosses 25 (FIG. 3). The inner frame 33 has an outermost radially inwardly directed annular flange 34 against which rests a peripheral edge 29 of a piece of tempered glass or glass panel 35 with a seal 36 sandwiched therebetween. An annular clamping collar 37 is fixed to the annular flange 34 of the inner frame 33 by conventional fasteners F1.

Though not illustrated, the conventional oven door inner frame assembly 9 is conventionally secured to pivot arms of an oven which are normally pivoted, counterbalanced and/or spring biased for pivoting movement between oven door open and oven door closed positions. In the closed position of the oven door, the interior of the oven (not shown) can, of course, be viewed through the tempered glass panel 15 of the door shell 10 and the tempered glass panel 35 of the oven door inner frame assembly 9.

A machine for molding the oven door outer shell 10 under heat and pressure from thermosetting SMC or BMC is illustrated in FIGS. 5–7, and 9–14 of the drawings, and is generally designated by the reference numeral 50.

The molding machine 50 includes a multi-part mold defined by at least two relatively movable mold bodies, namely, a lower mold body 51 and an upper mold body 52 defining therebetween in a closed position a generally polygonal annular mold cavity or chamber 60 (FIGS. 6, 7, 13 and 14).

Figure 11:
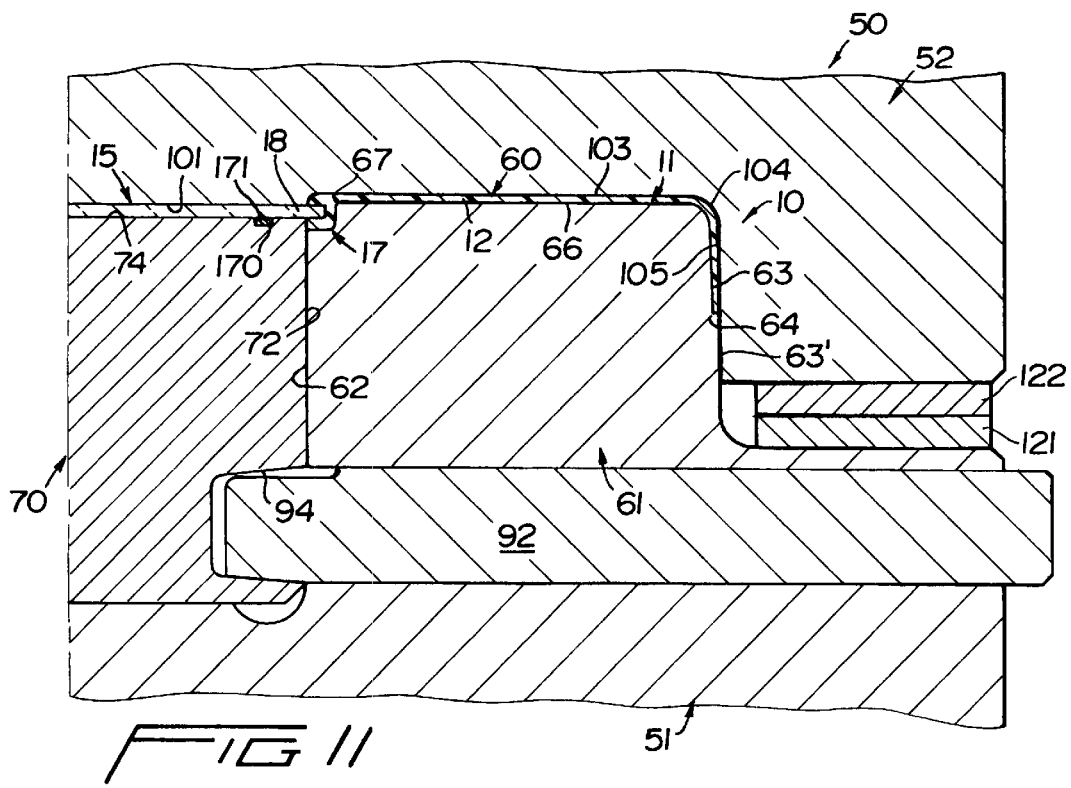
FIG. 11 is a fragmentary cross sectional view, similar to FIGS. 9 and 10, and illustrates the mold bodies completely closed during the thermosetting of the SMC under elevated temperature and pressure.

The lower mold body 51 is appropriately machined to define a generally upwardly projecting annular mold chamber defining member 61 defined by an inner polygonal surface 62, (FIGS. 6, 7 and 13) an outer polygonal flange-forming surface 63 (FIG. 13) terminating at an annular upwardly facing end face 64 and opposite thereto a radius surface 65 blending with an upper relatively flat annular surface 66. The upper annular surface 66 blends with an innermost radius surface 67 (FIG. 13) which in turn blends with an innermost peripheral annular surface 68. The surface 68 in turn blends with an annular upwardly facing surface 69 which lies in a horizontal plane offset from but generally parallel to a horizontal plane of the annular surface 66. The surface 63 flares approximately 3° from a vertically outboardmost plane Pvo (FIG. 13) outboard thereof, while the surface 68 similarly flares 3° from a vertically innermost plane Pvi (FIG. 13) inboard thereof. In other words, the surfaces 63, 68 and the respective planes Pvo, Pvi thereof are in upwardly converging relationship to each other which creates peripheral inboard and outboard seals, as will be described more fully hereinafter, to prevent SMC/BMC from being forced out of the annular mold chamber or cavity 60 even prior to the molding bodies 51, 52 reaching their completely closed position (FIGS. 7 and 11).

A generally polygonal or rectangular floater or clamping plate 70 (FIGS. 6, 7 and 13) is mounted for vertical sliding movement within a so-called insert pocket (unnumbered) defined in part by the surface 62 of the mold chamber defining member 61. An outer peripheral surface 72 of the floater 70 is in intimate sliding relationship with the surface 62 of the mold chamber defining member 61 and in part functions to close a peripherally innermost chamber portion or cavity portion 79 of the annular mold chamber or cavity 60 immediately adjacent an uppermost clamping surface 74 of the floater 70. The surface 74 of the floater or clamping plate 70 supports the tempered glass panel 15 during the molding of the oven door outer shell 10, as will be described more fully hereinafter.

Figure 12:
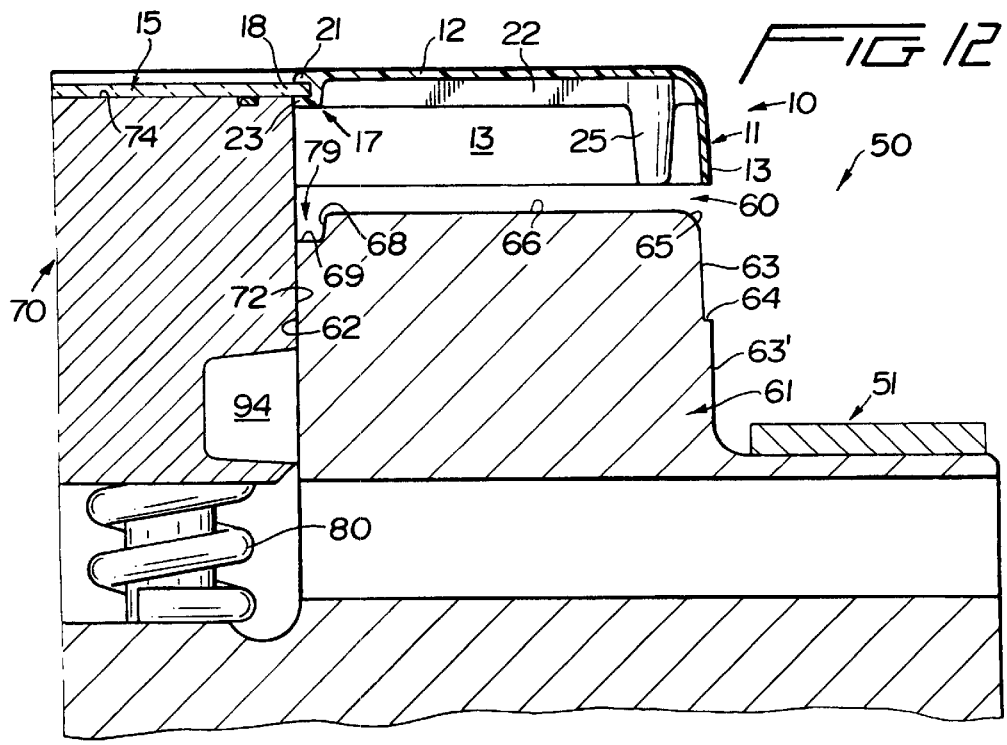
FIG. 12 is a fragmentary cross sectional view of the mold, similar to FIGS. 9, 10 and 11 of the drawings with the locking pin retracted and withdrawn from the position illustrated at FIG. 9, and illustrates the ejection of the cured outer shell by the upward movement of the floater under the influence of a plurality of ejector springs.

A plurality (six) of identical springs 80 (FIGS. 6, 7 and 12) normally bias the floater 70 to a position at which the upper surface 74 thereof is well above the surface 66 when the mold bodies 51 and 52 are open, as is illustrated in the product ejection position of FIG. 12 of the drawings. This figure corresponds to the load position except, of course, the space between the mold bodies is empty. However, before placing the piece of tempered glass 15 upon the surface 74 of the floater 70, the floater 70 is retracted against the bias of the springs 80 in a conventional manner by, for example, placing a "dummy" insert or gauge upon the top surface 74 of the floater 70 corresponding in thickness to the thickness of the glass panel 15, closing the mold bodies 51, 52, and manually or automatically moving diametrically opposing locking pins 91, 92 (FIGS. 7 and 9–11) into respective locking recesses 93, 94 of the floater 70. The mold bodies 51, 52 are then opened, the gauge is removed therefrom, and subsequent molding can be initiated by inserting the tempered glass panel 15 upon the surface 74 of the floater 70, as will be described more fully hereinafter.

At each corner (unnumbered) of the mold chamber defining member 61 and in part defining the cavity 60 there is provided a tapered frusto-conical upwardly opening bore 85 (FIGS. 6 and 8) which merges with a cylindrical bore 86 into each of which is positioned a stationary or movable cylindrical rod 87 having a reduced cylindrical end portion 88 above an annular face 89. The frusto-conical surface 85, the cylindrical portion 88 and the annular face 89 cooperatively form each of the molded integral cylindrical fastener-receiving bosses 25 and associated bores 26 (FIG. 3) of the frame member 11 during the molding thereof. Diagonal upwardly opening grooves 96 (FIG. 6) open through the upper annular surface 66 of the mold chamber defining member 61 and mold therein the reinforcing ribs 27 (FIG. 2) of the frame member 11 upon the operation of the molding machine 50.

The upper mold body 52 defines the "female" cavity portion of the annular mold cavity 60 and is defined from the center outward by a generally annular clamping surface or clamping portion 101 (FIGS. 6, 7 and 13) parallel to the clamping surface 74 of the floater 70 which collectively define means for clamping the tempered glass plate 15 therebetween. The annular surface 101 merges with an inboardmost peripheral surface 99 which merges with a radius surface 102 which in turn merges with an annular relatively flat surface 103 parallel to and spaced from the surface 66 of the lower mold body 51 and cooperative therewith to form the front wall 12 of the oven door outer shell 10. The annular surface 103 merges with a radius surface 104 adjacent and spaced from the radius surface 65 which in turn merges with a peripheral surface 105 substantially parallel to the surface 63, including the 3° angle offset to the vertical and lying in a plane Pro parallel to the plane Pvo.

The molding machine 50 includes shims 121, 122 (FIGS. 9–11) carried by the respective lower mold body 51 and the upper mold body 52 for achieving precise mold cavity dimensioning, particularly between the surfaces 66, 103 and 74, 101 to accommodate the molding of different thicknesses of the respective front wall 12 of the outer shell 10 and different thicknesses of the tempered glass plate 15 associated therewith. Conventional fasteners 123 (FIG. 7) are utilized to replace or add or change these shims 121, 122 as may be found necessary or desirable.

Hot fluid, such as oil preferably at 475° F., is introduced into the lower mold body 51 of the mold 50 through a flexible pipe 130 and circulates through ports (unnumbered) in the lower mold body 51 exiting therefrom through a flexible pipe 131. Similarly, hot fluid is introduced into the upper mold body 52 of the mold 50 through a flexible pipe 132, circulates through ports (unnumbered) in the upper body 52 and is discharged through another flexible pipe 133.

Identical fluid motor means 140 (FIGS. 5 and 6) in the form of conventional piston/cylinder motors are conventionally connected between and operate the mold bodies 51, 52 to reciprocate the same between the completely closed position (FIGS. 5, 7, 8 and 11) and the fully open position thereof (FIG. 12) along a reciprocal path of travel Rpt (FIG. 13).

The locking plungers 91, 92 are preferably held in their locked positions by manually rotated dogs 161, 162, respectively, (FIG. 5) though each plunger 91, 92 can be pneumatically moved into and removed from the respective tapered recesses 93, 94 in a manner clearly apparent from the drawings and FIG. 7 in particular.

Lastly, the upper surface or clamping surface 74 of the floater 70 is provided with an annular upwardly opening recess or channel 170 (FIGS. 14 and 15) which houses a bull-nosed or half-round resilient cushioning ring 171 which in the open position of the mold bodies 51, 52 (FIGS. 14 and 15) supports a lower surface (unnumbered) of the tempered glass panel 15 slightly above the surface 74. The purpose of the annular cushioning ring or cushion 171 is to provide gradual application of clamping forces against the tempered glass panel 15 during the closing of the mold bodies 51, 52 to preclude glass breakage, as might otherwise occur should tolerances be slightly "off." However, by virtue of the cushioning ring 171, as the clamping surface 101 of the downwardly moving upper mold body 52 contacts and initially exerts a downward closing force against the tempered glass panel 15, the cushioning ring 170 is compressed and the clamping forces between the surfaces 74, 101 are thereby progressively applied against the glass panel 15 until such time as the cushioning ring 171 is fully seated in the channel 170 (FIG. 13). Obviously, no matter the cross section of the cushioning ring 171, it must be equal to or less than the cross section of the channel 170 to be housed totally therein when completely compressed (phantom outline in FIG. 15).

METHOD OF OPERATION

It is assumed that the molding machine 50 is heated, preferably by heating both the lower and upper mold bodies 51, 52, by circulating therethrough (and through the floater 70, if thought necessary or desirable), hot fluid (oil) in the manner heretofore described. It is also assumed that the mold bodies 51, 52 are in the open position thereof with the locking pins 91, 92 holding the floater 70 in the "down" position shown in FIGS. 7, 9 and 11 of the drawings.

The tempered glass panel 15 is then manually or automatically positioned upon the cushioning ring 171, as shown in FIG. 9, which maintains a lower surface (unnumbered) of the tempered glass panel 15 spaced slightly above the clamping surface 74 of the floater 70, as is illustrated in FIGS. 14 and 15.

Sheets of thermosetting SMC (FIGS. 6 and 9) are then placed upon the upper annular surface 66 of the mold chamber defining member 61 of the lower mold 51 substantially centrally thereof, outboard of the intermediate peripheral surface 68 and inboard of the outermost peripheral surface 63 (FIG. 9). The number of sheets of SMC, the thickness or thicknesses thereof, the lengths and widths, the location and orientation upon the upper surface 66, and the total weight are dependent upon a number of factors, but chief among these is assuring that the total uncompressed volume of all of the sheets SMC correspond in volume to the total volume of the completely closed mold chamber or cavity 60 to assure that the SMC is progressively and correctly compression molded/extruded under heat (475° F.) and pressure (psi) upon the closing of the mold bodies 51, 52 in a predetermined fashion to consolidate totally within all cavity portions of the annular mold cavity 60 absent voids, leakage, marring, etc.

As the mold body moving means 140 move the mold bodies 51, 52 toward each other along the path of travel Rpt which is normal to the surfaces 66, 74, 101 and 103 and to the piece of glass 15, the heat and pressure applied thereby to the SMC begins to melt, homogenize and laterally flow or extrude the SMC inwardly and outwardly in the manner best illustrated in FIG. 10 of the drawings. With particular reference to FIGS. 10 and 13, the 3° rake or draft of the annular flange-forming surfaces 63, 63', 105 of the respective mold bodies 51, 52 come into contact and create an intimate peripheral seal S (FIGS. 10 and 13) about the entire periphery of the outermost portion of the annular mold chamber 60. The flange outer forming surface 105 essentially contacts the corner (unnumbered) define between the surface 63' and the annular upwardly facing surface 64 to form and maintain the seal S substantially at the relative position of the mold bodies 51, 52 illustrated in FIG. 10, and maintains (and expands the axial length) the peripheral seals until the mold bodies 51, 52 completely close (FIGS. 11 and 19). Thus, during the continued movement of the mold bodies 51, 52 toward each other, the SMC is extruded or caused to flow radially outwardly between the surfaces 66, 103; 65, 104; 63, 105 and to but not beyond the annular upwardly facing surface 64 eventually forming the peripheral flange 13 absent any leakage of the SMC beyond the annular seal S, as shown in FIG. 11.

From the position of the mold bodies 51, 52 shown in FIG. 10 until the complete closure thereof shown in FIG. 11, the SMC continues to extrude or flow both inwardly and outwardly, into the frusto-conical recesses 85 (FIGS. 6 and 8) and the rib-forming channels 96 (FIG. 6) until subsequently the annular surface 101 (FIG. 10) contacts the upper surface (unnumbered) of the tempered glass panel 15. Prior to this surface-to-surface contact, the SMC has not flowed under the closing pressure of the mold bodies 51, 52 leftward beyond the surfaces 62, 72 and 99. However, during the final closure of the mold bodies 51, 52 during which the cushioning ring 171 is compressed (FIG. 13), the final relative closing motion between the mold bodies 51, 52 extrudes the SMC into the innermost peripheral mold cavity portion 79 defined generally by the surfaces 68, 69, 72, 99 and 102. The SMC material thus extruded into the latter-defined capacity portion 79 completely encapsulates the edge 18 (FIGS. 4, 7 and 12) of the tempered glass panel 15 and intimately bonds thereto through the flange portions 21, 23 and the peripheral juncture portion 22 therebetween (FIG. 4).

The SMC (or BMC) material cures under the applied heat and pressure of the closed mold bodies 51, 52, and once curing is completed, the locking dogs 161, 162 are pivoted 90° to release the locking pins or plungers 91, 92, respectively, manually or automatically. The mold moving means 140 are then operated to move the mold bodies 51, 52 progressively from the closed position (FIG. 11) to the fully open position (FIG. 12) at which time the springs 80 bias the floater 70 upwardly to its "up" position which automatically strips or ejects the cured outer shell 10 (FIG. 12) from the now open annular mold cavity 60. The outer shell 10 is removed, the floater 70 is moved back to the "down" position shown in FIG. 7 automatically or in the manual manner earlier described and locked thereat by the locking pins 91, 92 and a new piece of tempered glass is placed upon the annular surface 74 of the floater 70 with SMC or BMC being again appropriately positioned upon the annular surface 66 of the lower mold 52 incident to the molding of another outer shell 10. The outer shell 10 is then assembled to an inner door frame assembly 11 in the manner heretofore described relative to FIG. 4 of the drawings.

The entire oven door (generally 10 in FIG. 4) is then appropriately united in a conventional manner to conventionally pivoted spring balanced/counter balanced oven door arms of a conventional oven. Prior to the assembly of the outer shell 10 and the inner oven door frame assembly 9, the peripheral flange 13 of the outer oven door shell 10 can also be post-formed with the vent slots 30, as was heretofore noted, and if desired, with the holes or bores 31.

Obvious details of the outer shell 10 can be varied, such as providing the front wall 12 with an integral molded handle formed during the molding process just described and, of course, varying the size of the opening 16 in the front wall 12. Obviously, the SMC/BMC can be varied in color to complement the particular oven/range to which the overall door (generally 10) is assembled. Likewise, though the inner oven door frame assembly 9 is peripherally exposed in FIG. 4, the flange 13 of the outer shell 10 can be molded longer than illustrated to completely encapsulate and entirely peripherally bound the inner oven door frame assembly 9 which could be more aesthetically pleasing depending upon specifics of the range or appliance with which the oven door (generally 10) is associated.

The molding can also be altered somewhat from that described with the same general result by, for example, opening the mold bodies 51, 52; releasing the plungers 91, 92, and maintaining the floater 70 spring biased upwardly in the position shown in FIG. 12 during the loading of the tempered glass sheet 15 upon the floater 70 and the application of the SMC upon the surface 66. The mold bodies 51, 52 would then be relatively moved toward each other during which time the surface 101 of the upper mold body 52 would contact the upper surface (unnumbered) of the tempered glass panel 15. Continued incremental closing movement between the mold bodies 51, 52 eventually results in the compression of the cushioning ring 171 into the annular upwardly opening channel 170 resulting in the gripping/clamping of the thermal glass panel 15 between the surfaces 101, 74. At this point in the closing operation the SMC (or BMC) upon the upper surface 66 of the lower mold body 51 has not been contacted by the upper annular surface 66 of the upper mold body 52. However, as the mold bodies 51, 52 continue to progressively close the annular mold chamber 60, the floater 70 and the tempered glass panel 15 descend to the final position thereof (FIG. 7). The SMC is eventually contacted, compressed and extruded during the final closing movement of the mold bodies 51, 52 resulting in the eventual formation of the annular seal S which occurs after, of course, the inboardmost portion of the annular molding chamber 60 has been completely closed at substantially the instant of clamping contact of the tempered glass panel 15 between the surfaces 74, 101. Therefore, under continued progressive closing of the annular mold cavity 60, the SMC cannot extrude beyond the innermost surfaces 72, 99, 102 and as closing continues the SMC cannot extrude beyond the outermost terminal portion of the mold because of the peripheral seal S which remains operative until the mold bodies 51, 52 are completely closed. The locking plungers 91, 92 can be then moved into the latching recesses 93, 94, respectively, to the position shown in FIG. 7 until curing has completed (approximately 2–3 minutes under 400° F.–525° F., preferably 475° F., oil-heated mold surface temperature). At the completion of curing the locking plungers 91, 92 are retracted from the latching recesses or bores 93, 94, respectively, and the mold bodies 51, 52 are relatively opened by movement along the path of travel Rpt with the resultant ejection of the outer shell 10 by the upward bias movement of the floater 70 under the force of the springs 80 in the manner heretofore described.

Figure 16:
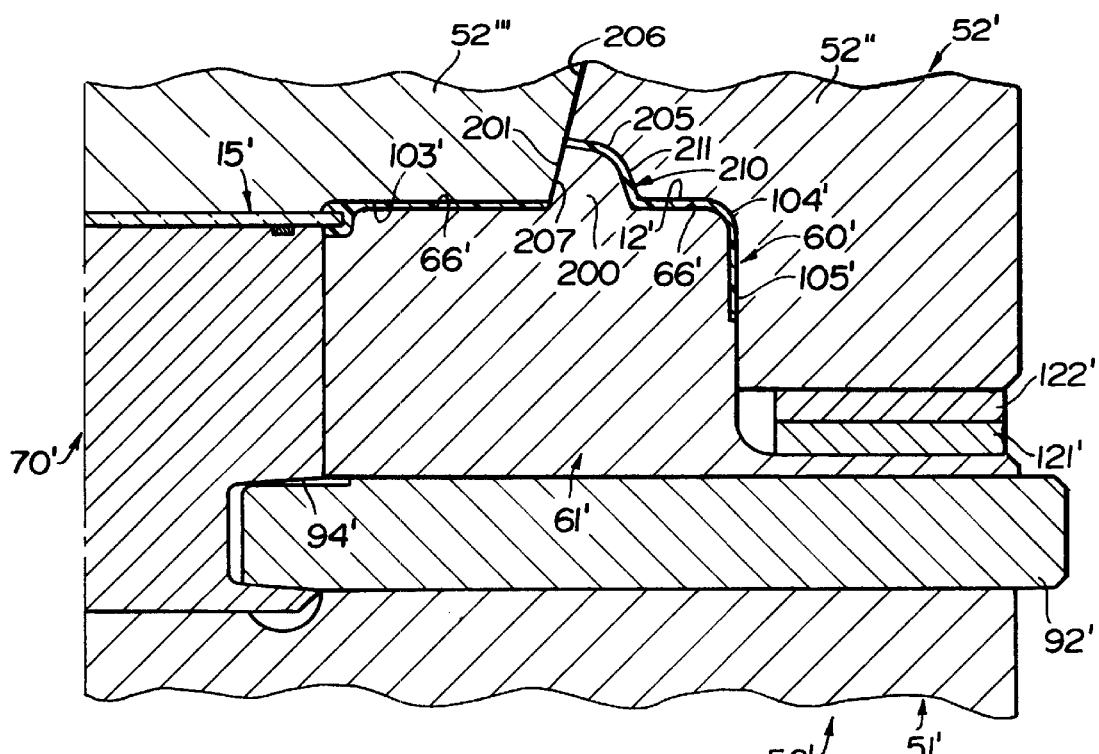
FIG. 16 is a fragmentary cross sectional view, similar to FIG. 11, and illustrates another embodiment of the invention in which upper and lower mold bodies are contoured to form an integrally molded handle in a front wall of another oven door outer shell of the invention.
Figure 17:
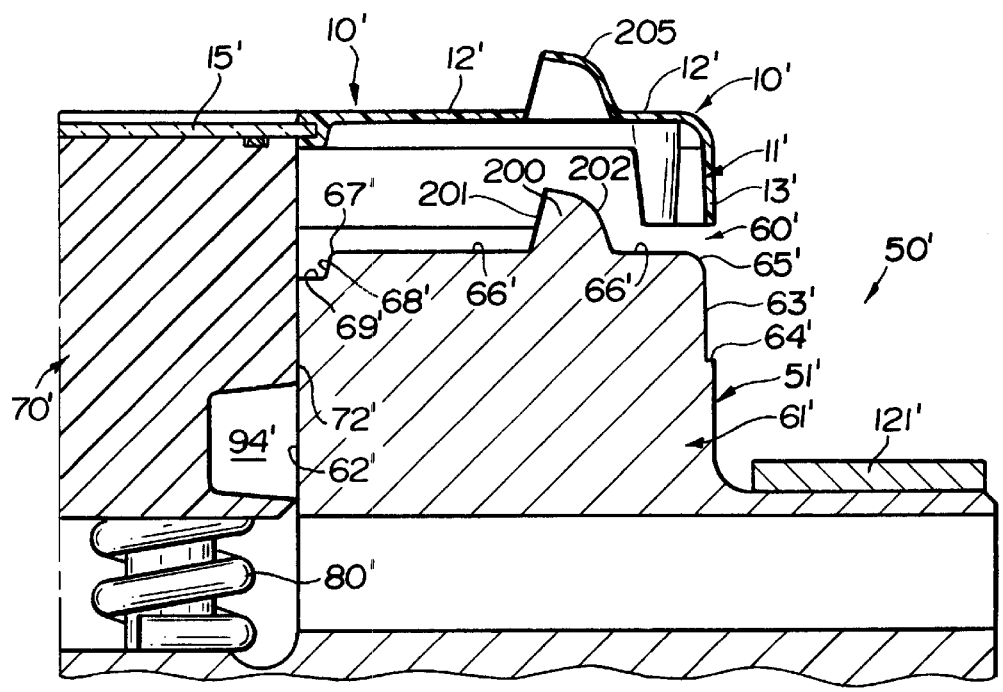
FIG. 17 is a cross sectional view of the mold of FIG. 16, and illustrates the mold in the open position thereof incident to the ejection and removal of the outer shell therefrom.

Reference is made to FIGS. 16 and 17 of the drawings which illustrate another molding machine 50' which is substantially identical to the molding machine 50 heretofore described, and thus includes primed numerals to identify identical components.

The molding machine 50' includes a multi-part mold defined by a lower mold body 51' and an upper mold body 52' defining therebetween in a closed position a generally polygonal annular mold cavity or chamber 60'.

The lower mold body 51' is essentially identical to the lower mold body 51 and, as is best illustrated in FIG. 17, includes identical mold cavity defining surfaces 63'–69'. However, the surface 66' is interrupted by an upwardly projecting handle-forming male mold portion 200 defined by a relatively straight surface 201 disposed at a slight obtuse angle to the inboardmost portion of the surface 66' and a curved surface 202. The surfaces 201, 202 extend lengthwise along the top portion of the front wall 12' of the eventually formed outer shell 10' (FIG. 17) and the distance of such extension dictates the length of an integrally molded handle 205. For example, the handle-forming mold portion 200 might have a length corresponding to the distance between the openings 31, 31 (FIGS. 1 and 2) resulting in the formation of the integrally molded handle 205 (FIG. 17) corresponding in length to the distance between the openings 31, 31. However, since the handle 205 is integrally molded, the top wall 12' (FIG. 17) would be devoid of the openings 31 which are rendered unnecessary by the integral molding of the handle or handle portion 205.

The upper mold body 52' is formed of two mold parts or mold portions, namely, an outer annular mold part 52" and an inner annular polygonal mold part 52'" having respective surfaces 206, 207 which in the closed position of the mold bodies 51', 52' abut each other and abut the surface 201 of the handle forming mold portion 200.

In the open position of the mold 50' (FIG. 17), appropriate SMC/BMC thermosetting material is seated atop the surface 66' both to the left and to the right of the handle-forming mold portion 200. Such thermosetting material might also be placed along the surface 202 adjacent its juncture with the surface 66', but the specific location of the SMC is such that upon the closing of the mold cavity 60' (FIG. 16), the SMC material will be compression molded and extruded in the manner heretofore described with respect to the mold 50 and, of course, will also completely fill a handle-forming chamber portion 210 defined by the surface 202 of the male handle-forming mold portion 200 and a complementary contoured female cavity surface 211 of the mold part 52".

While different SMC and BMC compositions can be utilized in conjunction with the present invention, those reduced to practice by the assignee of the present invention includes specifically SMC 1840 manufactured by Bulk Molding Compounds, Inc. of 1600 Powis Corp., West Chicago, Ill. 60185. The BMC material reduced to practice in accordance with this invention is BMC 130, also available from Bulk Molding Compounds, Inc.

Although preferred embodiments of the invention have been specifically illustrated and described herein, it is to be understood that minor variations may be made in the method and article without departing from the spirit and scope of the invention, as defined in the appended claims.

What is claimed is:

1. A method of molding a peripherally encapsulated product comprising the steps of:
   (a) providing a multi-part mold including at least two relatively movable mold bodies defining in a closed position thereof a substantially continuous annular inwardly opening mold chamber and inboard of the annular mold chamber opposing mold clamping portions,
   (b) placing a piece of glass between the mold clamping portions when the mold bodies are in an open position thereof,
   (c) heating at least one of the mold bodies,
   (d) placing thermosetting polymeric material upon the heated mold body within and about an area corresponding to the annular chamber and outboard of a substantially continuous peripheral edge of the piece of glass,
   (e) clamping the piece of glass between the mold clamping portions,
   (f) progressively relatively moving the mold bodies to the closed position thereof to thereby create compression forces which extrude the thermosetting polymeric material into the annular chamber and into complete encapsulation of the continuous peripheral edge including opposite face surfaces and a peripheral edge surface therebetween,
   (g) curing the thermosetting polymeric material under heat and pressure while the mold is in its closed position,
   (h) relatively moving the mold bodies to their open position, and
   (i) removing the peripherally encapsulated product from the mold chamber.

2. The product encapsulation method as defined in claim 1 wherein the thermosetting polymeric material is sheet molding compound (SMC).

3. The product encapsulation method as defined in claim 1 wherein the thermosetting polymeric material is bulk molding compound (BMC).

4. The product encapsulation method as defined in claim 1 wherein the mold bodies further define a flange-forming chamber portion substantially outboard of and surrounding the annular mold chamber, and during the performance of step (f) the thermosetting polymeric material is extruded into the flange-forming chamber portion to thereby provide the peripherally encapsulated product with an integrally molded peripheral flange.

5. The product encapsulation method as defined in claim 1 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

6. The product encapsulation method as defined in claim 1 wherein at least one of the mold bodies further defines a plurality of reinforcing rib-forming chamber portions located in spaced relationship to each other and extending substantially transverse to the annular mold chamber, and during the performance of step (f) the thermosetting polymeric material is extruded into the rib-forming chamber portions to thereby provide the peripherally encapsulated product with a plurality of integrally molded reinforcing ribs.

7. The product encapsulation method as defined in claim 1 wherein at least one of the mold bodies further defines a plurality of fastener receptive boss-forming chamber portions located in spaced relationship to each other, and during the performance of step (f) the thermosetting polymeric material is extruded into the boss-forming chamber portions to thereby provide the peripherally encapsulated product with a plurality of integrally molded fastener receptive bosses.

8. The product encapsulation method as defined in claim 1 wherein the annular mold chamber is of a generally polygonal configuration.

9. The product encapsulation method as defined in claim 1 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

10. The product encapsulation method as defined in claim 1 wherein the movements of steps (f) and (h) occur along a path of travel which is substantially normal to a plane of the piece of glass.

11. The product encapsulation method as defined in claim 1 wherein the movements of steps (f) and (h) occur along a path of travel which is substantially normal to a plane of the piece of glass, the mold bodies further define a flange-forming chamber portion substantially outboard of and surrounding the annular mold chamber and substantially parallel to but relieved at a substantially small acute angle to the path of travel, during the performance of step (f) the thermosetting polymeric material is extruded into the flange-forming chamber portion to thereby provide the peripherally encapsulated product with an integrally molded peripheral flange, and during the mold body movement of steps (f) the flange-forming chamber portion is sealed closed prior to the complete extrusion of the thermosetting polymeric material therein.

12. The product encapsulation method as defined in claim 2 wherein the mold bodies further define a flange-forming chamber portion substantially outboard of and surrounding the annular mold chamber, and during the performance of step (f) the thermosetting polymeric material is extruded into the flange-forming chamber portion to thereby provide the peripherally encapsulated product with an integrally molded peripheral flange.

13. The product encapsulation method as defined in claim 2 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

14. The product encapsulation method as defined in claim 2 wherein at least one of the mold bodies further defines a plurality of reinforcing rib-forming chamber portions located in spaced relationship to each other and extending substantially transverse to the annular mold chamber, and during the performance of step (f) the thermosetting polymeric material is extruded into the rib-forming chamber portions to thereby provide the peripherally encapsulated product with a plurality of integrally molded reinforcing ribs.

15. The product encapsulation method as defined in claim 2 wherein at least one of the mold bodies further defines a plurality of fastener receptive boss-forming chamber portions located in spaced relationship to each other, and during the performance of step (f) the thermosetting polymeric material is extruded into the boss-forming chamber portions to thereby provide the peripherally encapsulated product with a plurality of integrally molded fastener receptive bosses.

16. The product encapsulation method as defined in claim 2 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

17. The product encapsulation method as defined in claim 3 wherein the mold bodies further define a flange-forming chamber portion substantially outboard of and surrounding the annular mold chamber, and during the performance of step (f) the thermosetting polymeric material is extruded into the flange-forming chamber portion to thereby provide the peripherally encapsulated product with an integrally molded peripheral flange.

18. The product encapsulation method as defined in claim 3 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

19. The product encapsulation method as defined in claim 3 wherein at least one of the mold bodies further defines a plurality of reinforcing rib-forming chamber portions located in spaced relationship to each other and extending substantially transverse to the annular mold chamber, and during the performance of step (f) the thermosetting polymeric material is extruded into the rib-forming chamber portions to thereby provide the peripherally encapsulated product with a plurality of integrally molded reinforcing ribs.

20. The product encapsulation method as defined in claim 3 wherein at least one of the mold bodies further defines a plurality of fastener receptive boss-forming chamber portions located in spaced relationship to each other, and during the performance of step (f) the thermosetting polymeric material is extruded into the boss-forming chamber portions to thereby provide the peripherally encapsulated product with a plurality of integrally molded fastener receptive bosses.

21. The product encapsulation method as defined in claim 3 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

22. The product encapsulation method as defined in claim 4 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

23. The product encapsulation method as defined in claim 4 wherein at least one of the mold bodies further defines a plurality of reinforcing rib-forming chamber portions located in spaced relationship to each other and extending substantially transverse to the annular mold chamber, and during the performance of step (f) the thermosetting polymeric material is extruded into the rib-forming chamber portions to thereby provide the peripherally encapsulated product with a plurality of integrally molded reinforcing ribs.

24. The product encapsulation method as defined in claim 4 wherein at least one of the mold bodies further defines a plurality of fastener receptive boss-forming chamber portions located in spaced relationship to each other, and during the performance of step (f) the thermosetting polymeric material is extruded into the boss-forming chamber portions to thereby provide the peripherally encapsulated product with a plurality of integrally molded fastener receptive bosses.

25. The product encapsulation method as defined in claim 4 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

26. The product encapsulation method as defined in claim 23 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

27. The product encapsulation method as defined in claim 24 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

28. The product encapsulation method as defined in claim 25 wherein at least one of the mold bodies further defines a handle-forming chamber portion extending along one side of the annular mold chamber, and during the performance of step (f) the thermosetting polymeric material is extruded into the handle-forming chamber portion to thereby provide the peripherally encapsulated product with an integrally molded handle.

29. The product encapsulation method as defined in claim 26 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

30. The product encapsulation method as defined in claim 27 wherein the annular mold chamber is of a generally polygonal configuration and includes corner-forming chamber portions, and during the performance of step (f) the thermosetting polymeric material is extruded into the corner-forming chamber portions to thereby provide the peripherally encapsulated product with a plurality of integrally molded corners.

31. The product encapsulation method as defined in claim 27 wherein at least one of the mold bodies further defines a plurality of reinforcing rib-forming chamber portions located in spaced relationship to each other and extending substantially transverse to the annular mold chamber, and during the performance of step (f) the thermosetting polymeric material is extruded into the rib-forming chamber portions to thereby provide the peripherally encapsulated product with a plurality of integrally molded reinforcing ribs.

32. A method of molding a peripherally encapsulated product comprising the steps of:
    (a) providing a multi-part mold including at least two relatively movable mold bodies defining in a closed position thereof a substantially continuous annular inwardly opening mold chamber having a handle forming chamber portion and inboard of the annular mold chamber opposing mold clamping portions,
    (b) placing a piece of glass between the mold clamping portions when the mold bodies are in an open position thereof,
    (c) heating at least one of the mold bodies,
    (d) placing thermosetting polymeric material upon the heated mold body within and about an area corresponding to the annular chamber and outboard of a substantially continuous peripheral edge of the piece of glass,
    (e) clamping the piece of glass between the mold clamping portions,
    (f) progressively relatively moving the mold bodies to the closed position thereof to thereby create compression forces which extrude the thermosetting polymeric material into the annular chamber and the handle forming chamber portion thereof and into complete encapsulation of the continuous peripheral edge including opposite face surfaces and a peripheral edge surface therebetween,
    (g) curing the thermosetting polymeric material under heat and pressure while the mold is in its closed position to form a front annular wall having an integrally molded handle and a glass window defined by the piece of glass,
    (h) relatively moving the mold bodies to their open position, and
    (i) removing the peripherally encapsulated product from the mold chamber.

33. The product encapsulation method as defined in claim 32 wherein the thermosetting polymeric material is sheet molding compound (SMC).

34. The product encapsulation method as defined in claim 32 wherein the thermosetting polymeric material is bulk molding compound (BMC).

35. The molding method as defined in claim 32 including the step of post-forming openings in the flange after the performance of step (i).

36. The molding method as defined in claim 33 including the step of post-forming openings in the flange after the performance of step (i).

37. The molding method as defined in claim 34 including the step of post-forming openings in the flange after the performance of step (i).

38. A method of molding a peripherally encapsulated product comprising the steps of:
    (a) providing a multi-part mold including at least two relatively movable mold bodies defining in a closed position thereof a substantially continuous annular inwardly opening mold chamber and inboard of the annular mold chamber opposing mold clamping portions,
    (b) placing a piece of glass between the mold clamping portions when the mold bodies are in an open position thereof,
    (c) heating at least one of the mold bodies,
    (d) placing thermosetting polymeric material upon the heated mold body within and about an area corresponding to the annular chamber and outboard of a substantially continuous peripheral edge of the piece of glass,
    (e) clamping the piece of glass between the mold clamping portions,
    (f) progressively relatively moving the mold bodies to the closed position thereof to thereby create compression forces which extrude the thermosetting polymeric material into the annular chamber and into complete encapsulation of the continuous peripheral edge including opposite face surfaces and a peripheral edge surface therebetween,
    (g) curing the thermosetting polymeric material under heat and pressure while the mold is in its closed position,
    (h) relatively moving the mold bodies to their open position,
    (i) removing the peripherally encapsulated product from the mold chamber, and
    (j) post-forming openings in a front wall of the peripherally encapsulated product after the performance of step (i).

39. The product encapsulation method as defined in claim 38 wherein the thermosetting polymeric material is sheet molding compound (SMC).

40. The product encapsulation method as defined in claim 38 wherein the thermosetting polymeric material is bulk molding compound (BMC).

41. The molding method as defined in claim 38 including the step of post-forming openings in the flange after the performance of step (i).

42. The molding method as defined in claim 39 including the step of post-forming openings in the flange after the-performance of step (i), and securing a handle utilizing the post-formed openings.

43. The molding method as defined in claim 39 including the step of post-forming openings in the flange after the performance of step (i).

44. The molding method as defined in claim 39 including the step of post-forming openings in the flange after the performance of step (i), and securing a handle utilizing the post-formed openings.

45. The molding method as defined in claim 40 including the step of post-forming openings in the flange after the performance of step (i).

46. The molding method as defined in claim 40 including the step of post-forming openings in the flange after the performance of step (i), and securing a handle utilizing the post-formed openings.

47. A method of molding a peripherally encapsulated product comprising the steps of:
 (a) providing a multi-part mold including at least two relatively movable mold bodies defining in a closed position thereof a substantially continuous annular inwardly opening mold chamber and inboard of the annular mold chamber opposing mold clamping portions,
 (b) placing a piece of glass between the mold clamping portions when the mold bodies are in an open position thereof,
 (c) placing thermosetting material upon one of the mold bodies within and about an area corresponding to the annular chamber and outboard of a substantially continuous peripheral edge of the piece of glass,
 (d) clamping the piece of material between the mold clamping portions,
 (e) progressively relatively moving the mold bodies to the closed position thereof to thereby create compression forces which extrude the polymeric material into the annular chamber and into complete encapsulation of the continuous peripheral edge including opposite face surfaces and a peripheral edge surface therebetween,
 (f) curing the theremosetting material while the mold is in its closed position,
 (g) relatively moving the mold bodies to their open position, and
 (h) removing the peripherally encapsulated product from the mold chamber.

48. The product encapsulation method as defined in claim 4 wherein the thermosetting polymeric material is sheet molding compound (SMC).

49. The product encapsulation method as defined in claim 22 wherein the thermosetting polymeric material is sheet molding compound (SMC).

50. The product encapsulation method as defined in claim 31 wherein the thermosetting polymeric material is sheet molding compound (SMC).

51. The product encapsulation method as defined in claim 47 wherein the thermosetting material is sheet molding compound (SMC).

* * * * *